United States Patent

[11] 3,562,527

[72] Inventor Jean Claude Adam Chaimowicz
Greenford, England

[21] Appl. No. 745,496
[22] Filed July 17, 1968
[45] Patented Feb. 9, 1971
[73] Assignee Mining & Chemical Products Ltd.
Middlesex, England
a British company
[32] Priority July 17, 1967
[33] Great Britain
[31] 32,824

[54] INSULATED SIGNAL COUPLER
5 Claims, 1 Drawing Fig.

[52] U.S. Cl. .......... 250/83, 250/83.3, 250/239
[51] Int. Cl. .......... G01t 1/00
[50] Field of Search .......... 250/83, 83.3IR, 239; 250/199; 350/96WG

[56] References Cited
UNITED STATES PATENTS
3,385,970 5/1968 Coffin, Jr. et al. .......... 250/239X
OTHER REFERENCES
Miller, Stewart E., " Communication by Laser," SCIENTIFIC AMERICAN, vol. 214, No. 1, pp. 19— 27, Jan. 1966.

*Primary Examiner*—James W. Lawrence
*Assistant Examiner*—Davis L. Willis
*Attorney*—Cushman, Darby & Cushman

ABSTRACT: A signal-coupling device for signal coupling but electrically insulating two parts of an electronic circuit. The device has a gallium arsenide diode and a photoelectric receiving cell both in a housing in which is also a lens system which collimates the radiation from the gallium arsenide diode and focusses the collimated radiation on to the receiving cell. The housing is in several parts, one of which is electrically insulated from the others.

PATENTED FEB 9 1971
3,562,527
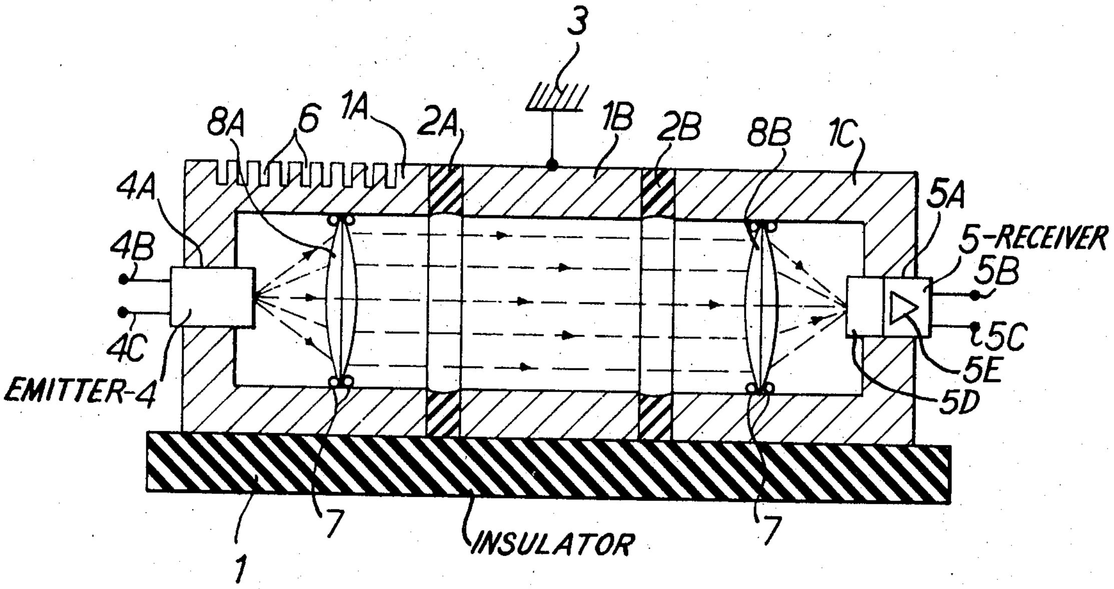
INVENTOR
JEAN CLAUDE ADAM CHAIMOWICZ
BY Cushman, Darby & Cushman
ATTORNEYS

INSULATED SIGNAL COUPLER

FIELD OF THE INVENTION

This invention relates to a signal-coupling device whereby two parts of an electronic circuit can be signal coupled yet electrically insulated. Such a device is of use where a low voltage circuit part is to be connected to a high voltage circuit part; it is then desirable to isolate electrically the high voltage part. As an example, a cathode ray tube may have accelerating anodes at earth potential and a light intensity modulating grid at say from 2000 to 20000 volts; to modulate the beam an amplifier operating at say 200 volts may be used and it is very desirable that the high voltage of from 2000 to 20000 volts should be isolated from the amplifier.

DESCRIPTION OF THE PRIOR ART

One such signal-coupling device is known having a Ga As infrared emitting diode connecting to the signal input and a photoelectric receiver cell connected to the output. The receiver cell picks up the emitted infrared signal which passes across an isolating space between the emitting diode and the receiver cell.

It is an object of this invention to improve such a device.

SUMMARY OF THE INVENTION

According to this invention there is provided a signal-coupling device having a housing, a Ga As infrared emitter and a photoelectric-receiving cell characterized in that a lens system is mounted in the housing and is adapted to collimate emitted infrared radiation and to focus the collimated radiation on to the photoelectric-receiving cell, and further characterized in that the housing is formed in at least three parts, one part mounting the emitter, another part mounting the cell, and an intermediate part being electrically insulated from the other parts. Preferably the receiving cell is combined in a single unit device with an amplifier, as disclosed in our copending application Ser. No. 625,682. The lens system may be formed as a unit which can be inserted into or removed from the signal-coupling device as a whole.

A signal-coupling device in accordance with the invention is virtually noncapacitive between the input and output, and, being unidirectional, is virtually free of backward signal propagation.

DESCRIPTION OF AN EMBODIMENT

An embodiment of the invention will now be described by way of example, with reference to the accompanying drawing, the single FIG. of which is a central longitudinal section.

Referring to the drawing a signal-coupling device has a metallic housing in three parts 1A, 1B and 1C, all mounted on a base 1 of electrically insulating material. The intermediate part 1C is electrically insulated at 2A and 2B from the end parts 1A and 1B, and also it is earthed at 3 to a zero potential point of the circuit in which the device is being used.

Mounted in an aperture 4A of the housing part 1A is a Ga As infrared emitting diode 4, with input wires 4B, 4C. Mounted in an aperture 5A of the housing part 1C is a receiver unit 5 which is a combined photoelectric-receiving cell 5D and amplifier 5E, as referred to above, and which has output wires 5B, 5C.

The housing part 1A is slotted at 6 for purposes of heat dissipation.

Mounted respectively in the housing parts 1A and 1C by means of rings 7 are two pairs of lenses 8A, 8B, which, as indicated by the arrows, collimate and focus the infrared radiation from the diode 4 on to the photoelectric cell of the receiver unit 5.

In one construction in accordance with the invention the capacitance was found to be 0.4 pf, the breakdown voltage 2.2 KV, the optimum input power level 300 mw, and the frequency response DC up to 5 kHz. The housing is of rectangular, preferably square, transverse cross section to permit a number of devices to be stacked, although devices for stacking could omit the slots 6.

The signal coupling device of the invention provides a relatively high power transfer factor from input wires to output wires, with a relatively low capacitance. The power transfer factor can be more than 1, which is many times greater than the factor in known isolating devices.

The device is relatively inexpensive, yet strong and hard wearing.

I claim:

1. A signal-coupling device having a housing, a Ga As infrared emitter and a photoelectric-receiving cell characterized in that a lens system is mounted in the housing and is adapted to collimate emitted infrared radiation and to focus the collimated radiation on to the photoelectric-receiving cell, and further characterized in that the housing is formed in at least three parts, one part mounting the emitter, another part mounting the cell, and an intermediate part being electrically insulated from the other parts.

2. A device according to claim 1 characterized in that the photoelectric cell forms part of a unit device which also includes an amplifier.

3. A device according to claim 1 characterized in that the three parts are fixed on a base of insulating material.

4. A device according to claim 1 characterized in that the lens system comprises two pairs of lenses, one pair being mounted in the said one housing part and the other pair being mounted in the said other housing part.

5. A device according to claim 1 characterized in that the lens system is formed as a unit which can be inserted into or removed from the signal-coupling device as a whole.